(12) United States Patent
Tichborne et al.

(10) Patent No.: US 9,409,651 B2
(45) Date of Patent: Aug. 9, 2016

(54) AIRCRAFT AERIAL REFUELLING SYSTEM (75) Inventors: Franklin Tichborne, Bristol (GB);
Mark Lawson, Chepstow (GB); Hugh Freeman, Tredington (GB); Arnaud Epifanie, Bath (GB); Adrian Edwards, Chepstow (GB)

(73) Assignee: Airbus Operations Limited, Bristol (GB)

( * ) Notice: Subject to any disclaimer, the term of this patent is extended or adjusted under 35 U.S.C. 154(b) by 1189 days.

(21) Appl. No.: 13/454,157

(22) Filed: Apr. 24, 2012

(65) Prior Publication Data
US 2012/0273619 A1 Nov. 1, 2012

(51) Int. Cl.
*B64D 39/00* (2006.01)

(52) U.S. Cl.
CPC ..................... *B64D 39/00* (2013.01)

(58) Field of Classification Search
CPC ........ B64D 37/14; B64D 37/16; B64D 37/18; B64D 39/00
See application file for complete search history.

(56) References Cited

U.S. PATENT DOCUMENTS

| | | | |
|---|---|---|---|
| 2,944,488 A | 7/1960 | Meyer | |
| 5,237,975 A * | 8/1993 | Betki et al. | 123/497 |
| 2004/0011052 A1 | 1/2004 | Clements | |
| 2006/0278761 A1 | 12/2006 | Cutler et al. | |
| 2007/0215115 A1 | 9/2007 | Hazama | |
| 2008/0173762 A1 | 7/2008 | Crowley | |
| 2010/0243061 A1 | 9/2010 | Mouskis et al. | |
| 2011/0231056 A1 | 9/2011 | Sjungargard et al. | |
| 2013/0119202 A1 * | 5/2013 | French | 244/135 A |

FOREIGN PATENT DOCUMENTS

| | | |
|---|---|---|
| DE | 4243118 A1 | 6/1994 |
| EP | 1 731 422 A1 | 12/2006 |
| EP | 1731422 A1 | 12/2006 |
| GB | 2449503 A | 11/2008 |
| WO | 2010061155 A1 | 6/2010 |

OTHER PUBLICATIONS

Search Report corresponding to GB 1107115.6, dated Aug. 23, 2011.
European Search Report. Application No. EP 12 16 5221. Dated Nov. 3, 2015.

* cited by examiner

*Primary Examiner* — Brian M O'Hara
(74) *Attorney, Agent, or Firm* — Hauptman Ham, LLP (57) ABSTRACT

An aircraft aerial refueling system including at least one pressure controlled fuel pump having a control system adapted to regulate the pump outlet fuel pressure using an outlet fuel pressure signal as control feedback. Also, methods of operating an aircraft aerial refueling system.

21 Claims, 7 Drawing Sheets

AIRCRAFT AERIAL REFUELLING SYSTEM

RELATED APPLICATIONS

The present application is based on, and claims priority from, British Application Number 1107115.6, filed Apr. 28, 2011, the disclosure of which is hereby incorporated by reference herein in its entirety.

FIELD OF THE INVENTION

The present invention relates to an aircraft aerial refueling system, and in particular relates to a high flow rate dispense fuel pump of the system. The invention also relates to methods of operating the system.

BACKGROUND OF THE INVENTION

Aircraft are typically designed to contain fuel in their wings. This fuel is pumped between tanks and to the engines by relatively low power pumps at a rate capable of sustaining the maximum fuel usage of the engines, with a margin of approximately 50%.

Aerial refueling tanker aircraft additionally typically have much more powerful fuel pumps designed to ensure that fuel is dispensed to a receiving aircraft within a reasonably short time. Tanker aircraft typically store fuel in multiple tanks from which fuel can either be used for normal aircraft operation or for refueling following aircraft, e.g. via a trailing hose dispense station. To achieve fast dispense rates it is desirable to pump fuel from several tanks simultaneously to one or more of a plurality of dispense stations.

A conventional aerial refueling system, such as that described in US 2006/0278761, has a plurality of fuel pumps of a specified power rating and which are each selectively energized during fuel transfer and refueling operations. The fuel pumps are connected via a common gallery to a plurality of dispense stations.

It is generally desirable to achieve a high rate at which fuel can be dispensed from a tanker aircraft to following aircraft. However, simply up-rating the power of existing fuel pump technology presents challenges in the design of other aircraft systems.

If a fuel pipe ruptures in a tank then an inadvertent transfer will take place into that tank. Typically the fuel will then fill that tank and cause its pressure to increase.

Normally when a tank hits the overflow level an alert is created to the crew who will resolve the situation by shutting down the offending pump(s). The overpressure caused by this type of event is adequately catered for by the design strength of the wing and the available overflow paths. An attempt to increase the fuel dispense rate using existing fuel pump technology may necessitate strengthening of the wing structure and/or the overflow system, which could add unacceptable weight to the aircraft.

A pump capable of dispensing fuel at a high rate typically has a high pressure outlet when the pump is turned on just prior to commencing an aerial refueling operation. When fuel starts flowing to the receiving aircraft the pressure then drops significantly. On disconnect of the receiving aircraft the pressure then steps back again to the maximum until the pump is switched off. These step changes in pressure can cause "pipe-hammer" which can contribute to pipe or connector rupture. An attempt to increase the fuel dispense rate using existing fuel pump technology may exacerbate these step changes in pressure and could increase the risk of a pipe rupture event.

If fuel is being dispensed from multiple tanks simultaneously then the tank nearest to the active dispense station will typically deplete faster than those further along the fuel gallery due to flow resistance which is dependent on the distance the fuel travels through the network of pipes and valves. Also, fuel pumps typically have a wide variation in performance, perhaps 5-10%, hence it is not possible to rely on matching the pumps for equal flows. At high dispense rates this will affect the lateral and/or longitudinal weight balance of the aircraft due to the difference between the rate of depletion of the fuel volume in the various tanks. If an unbalanced fuel load follows a dispense operation then the crew may need to perform manual cross-feeds before the next dispense, or to rebalance for the return to base flight sector. Unbalanced wing fuel loads result in intervention from the flight control system which compensates the imbalance with flap settings, resulting in less efficient flight. An attempt to increase the fuel dispense rate using existing fuel pump technology may increase the level of crew intervention required to rebalance the aircraft, and may even extend beyond the crew's capabilities within the aircraft operational envelope.

SUMMARY OF THE INVENTION

A first aspect of the invention provides an aircraft aerial refueling system including at least one pressure controlled fuel pump having a control system adapted to regulate the pump outlet fuel pressure using an outlet fuel pressure signal as control feedback.

A second aspect of the invention provides a method of operating an aircraft aerial refueling system including at least one pressure controlled fuel pump, the method comprising regulating the pump outlet fuel pressure using an outlet fuel pressure signal as control feedback.

The invention is advantageous in that the fuel pump is operable to regulate the pump outlet fuel pressure. This contrasts with the binary on/off setting of prior art dispense fuel pumps used currently in tanker aircraft.

Preferably, the pump outlet fuel pressure can be regulated throughout a wide range of pressures. For example, the pump outlet fuel pressure may be regulated at intervals of less than 1 psi (preferably around 0.1 psi) from 0 psig up to around 30 psig. This enables the dispense fuel pumps not only to meet the high dispense rates required for an aerial refueling operation but also to act as a backup for the much lower flow rate transfer fuel pumps for transferring fuel between tanks.

The pump outlet preferably includes a pressure sensor configured to transmit the outlet fuel pressure signal. The pump control system is preferably adapted to receive a demand fuel pressure signal.

The pump control system may be adapted to compare the demand fuel pressure signal with the outlet fuel pressure signal, and to provide a pump drive signal to the pump based upon the demand fuel pressure input signal and any difference between the demand fuel pressure signal and the outlet fuel pressure signal.

The pump control system may include a proportional-integral-differential (PID) controller for comparing the demand fuel pressure input signal with the outlet fuel pressure signal.

The fuel pump control system is preferably integrated with the fuel pump and is operable to automatically control the pump outlet fuel pressure depending on the demand fuel pressure signal. The feedback control enables the integrated control system to continuously monitor the pump outlet fuel pressure such that it can instantly react to changing situations without intervention by the aircraft crew.

For example, in the event of a pipe burst within a fuel tank, the outlet pressure is maintained at the fuel pump demand pressure which is normally set as the safe pressure for a fuel tank. The integrated control system automatically reacts by adjusting the pump power such that the pump outlet pressure does not exceed the demand pressure, thereby ensuring that the tank does not experience a high pressure surge. In this way, the pressure in the fuel pipe never reaches the maximum capability of the pump and so the fuel tank structure can be designed for a lower controlled pressure level, thus saving aircraft weight whilst increasing the maximum dispense flow rate of the pump as compared with existing pump technology.

Furthermore, it becomes possible to regulate the maximum pump outlet pressure according to the ambient atmospheric pressure outside the aircraft. Whilst the ambient pressure decreases with increasing altitude, the maximum relative pump outlet pressure for a low altitude refueling operation can be regulated to be the same as for a high altitude refueling operation. In addition it provides the capability of maintaining the maximum safe differential pressure for the case where a pipe ruptures inside a fuel tank. Without variable output pressure control, the maximum dispense flow rate would drop off at lower altitudes leading to an increase in the time required to complete an aerial refueling operation. The invention enables the aerial refueling time to be optimised to be as short as possible for all altitudes.

The aircraft aerial refueling system may further comprise a Fuel Quantity and Management System (FQMS) adapted to provide the demand fuel pressure signal to the pump control system. The demand fuel pressure signal may be dependent upon the ambient air pressure outside the aircraft. The FQMS may be adapted to receive an ambient air pressure signal and to modify the demand fuel pressure signal according to the ambient air pressure value. The aircraft aerial refueling system may further comprise an Air Data System (ADS) is adapted to provide the ambient air pressure signal to the FQMS. On some aircraft this is combined with other functions, for example a GPS & Air Data & Inertial Reference System (GADIRS).

The pump may include a motor adapted to receive a pump drive signal from the control system. The pump may be a centrifugal pump with an impeller.

The aircraft aerial refueling system may include a plurality of the pressure controlled fuel pumps, and a plurality of fuel tanks fluidically connected to at least one aerial refueling dispense station, wherein at least one of the pressure controlled fuel pumps is associated with each of the tanks. The dispense stations may be connected via a common fuel gallery to the plurality of fuel tanks.

The pressure controlled fuel pump technology together with a capability to accurately measure the fuel level within each tank enables further aspects of the invention for balancing the fuel level between multiple fuel tanks and/or for balancing the aircraft during a high rate aerial refueling operation.

Accordingly, a third aspect of the invention provides a method of operating an aircraft aerial refueling system including a plurality of fuel tanks, a plurality of aerial refueling dispense stations, and at least one pressure controlled fuel pump associated with each of the fuel tanks, and the method comprising automatically substantially maintaining fuel balance between the tanks during a high flow rate fuel dispense from the plurality of fuel tanks simultaneously via one or more of the aerial refueling dispense stations by controlling the outlet pressure of each fuel pump.

A fourth aspect of the invention provides a method of operating an aircraft aerial refueling system including a plurality of fuel tanks, a plurality of aerial refueling dispense stations, and at least one pressure controlled fuel pump associated with each of the fuel tanks, and the method comprising automatically substantially maintaining aircraft lateral and/or longitudinal weight balance during a high flow rate fuel dispense from the plurality of fuel tanks simultaneously via one or more of the aerial refueling dispense stations by controlling the outlet pressure of each fuel pump.

The aircraft aerial refueling system may further comprise computer readable storage media containing a set of instructions, e.g. in software, for controlling the pressure controlled fuel pumps individually.

The set of instructions may include a set of nominal pump outlet pressure settings for the plurality of pressure controlled fuel pumps depending on the status of the aerial refueling dispense station(s). The fuel pumps may be set to a nominal initial setting at the start of an aerial refueling operation depending on which dispense stations are active. For example, if a left wing dispense station is actively engaged to commence an aerial refueling operation, then the left wing dispense fuel pumps may be set initially to a lower demand pressure than the right wing dispense fuel pumps to compensate for predicted cross aircraft pipe resistance. During the aerial refueling operation, both left and right wing fuel tanks should be depleted at an approximately equal rate.

However, the set of instructions may further include a set of pump outlet pressure setting adjustments for the plurality of pressure controlled fuel pumps depending on a fuel volume within each tank. By continuously monitoring the tank fuel levels it becomes possible to iteratively adjust the pump demand pressures to maintain balanced residual fuel quantities in each tank irrespective of pump, pipe and valve performance or flow resistance variations. If a difference in the fuel level between the left and right wing fuel tanks, for example, reaches a predetermined maximum difference, then the pump pressures can be adjusted accordingly to bring the fuel levels in the left and right wing fuel tanks back to approximately the same level. All this may occur without any crew intervention.

Automatically maintaining the fuel balance and/or the aircraft longitudinal/lateral balance during a high flow rate aerial refueling operation provides several advantages. The dispense rate may be optimised and made higher than would otherwise be achievable. Without the system, one fuel tank could deplete preferentially and when near empty the dispense rate may reduce by around half if the dispense continues from fewer, or even just one, fuel tank. Also, the aircraft crew do not need to perform a lengthy fuel transfer operation following aerial refueling, such that the aircraft can be readied for a subsequent aerial refueling or return to base flight sector that much faster. The demands on the aircraft crew to maintain the aircraft and/or fuel balance during refueling are reduced and may even be nil. Since the aircraft may remain balanced at all times the efficiency of the flight is improved, thus reducing fuel burn.

The aircraft aerial refueling system may further comprise a Fuel Quantity and Management System (FQMS) configured to measure the fuel level within each tank. The step of controlling the outlet pressure of each fuel pump may include monitoring a fuel level within each fuel tank and adjusting the outlet pressure for each fuel pump depending on the measured fuel levels.

The set of pump outlet pressure setting adjustments may be configured to automatically adjust the aircraft weight balance to within predetermined limits. For example,

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
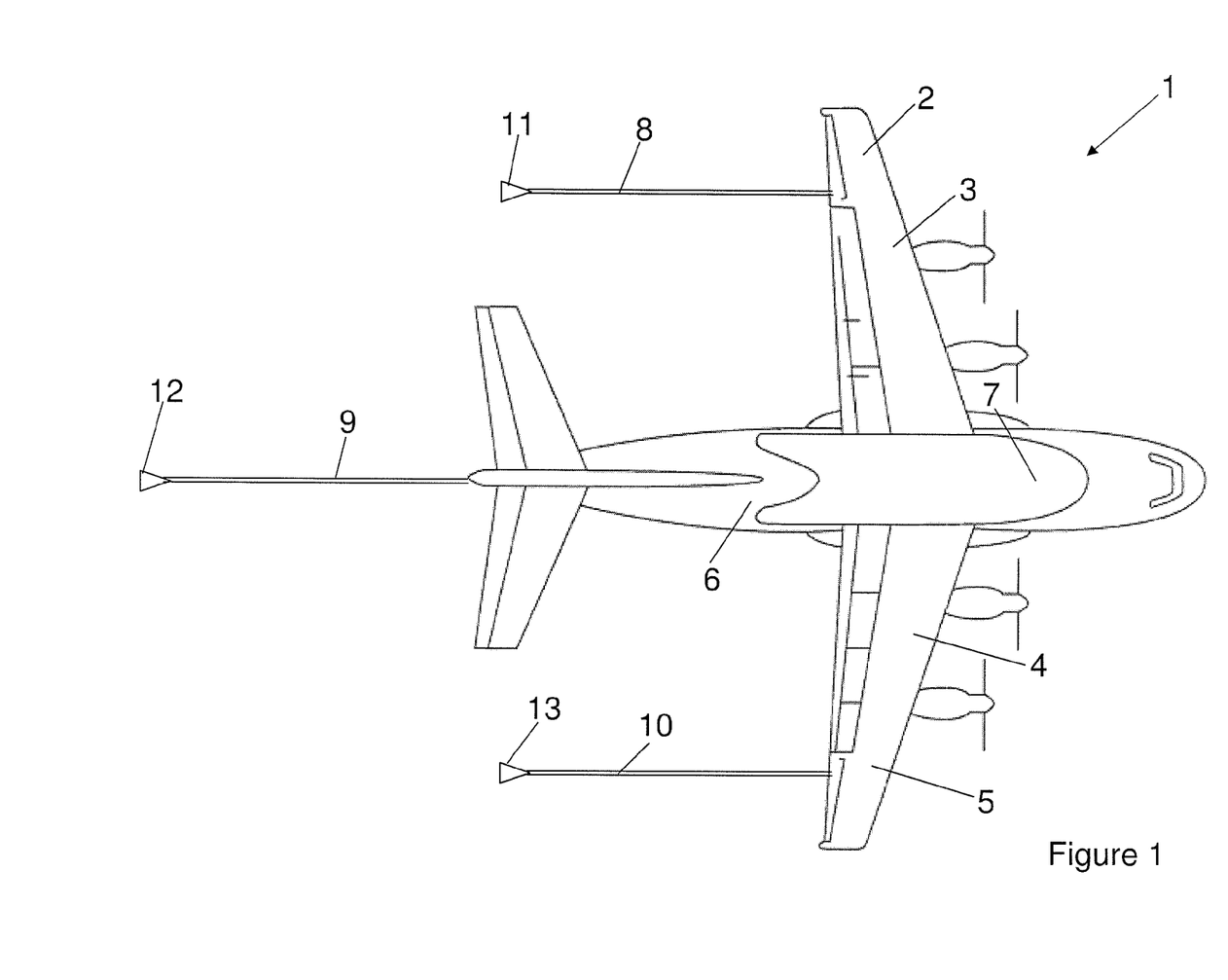
FIG. 1 illustrates a plan view of a tanker aircraft having two wing and one tail aerial refueling dispense stations with the refueling drogues shown extended.

FIG. 1 illustrates a top plan view of an aerial refueling tanker aircraft 1. The aircraft 1 is equipped with multiple fuel tanks including a left wing tank 3 within left wing 2, a right wing fuel tank 4 within right wing 5, and two auxiliary cargo hold fuel tanks 6, 7, one disposed aft of the wing fuel tanks 3, 4 and another disposed forward of the wing fuel tanks 3, 4 within the aircraft fuselage.

The aircraft 1 is equipped with multiple fuel dispense stations including one dispense station mounted in under wing pods of both the left and right wings 2, 5 and a further dispense station located in the tail of the aircraft 1. Each dispense station includes a retractable trailing refueling hose 8, 9, 10 having a refueling drogue 11, 12, 13 at its distal end.

Figure 2:
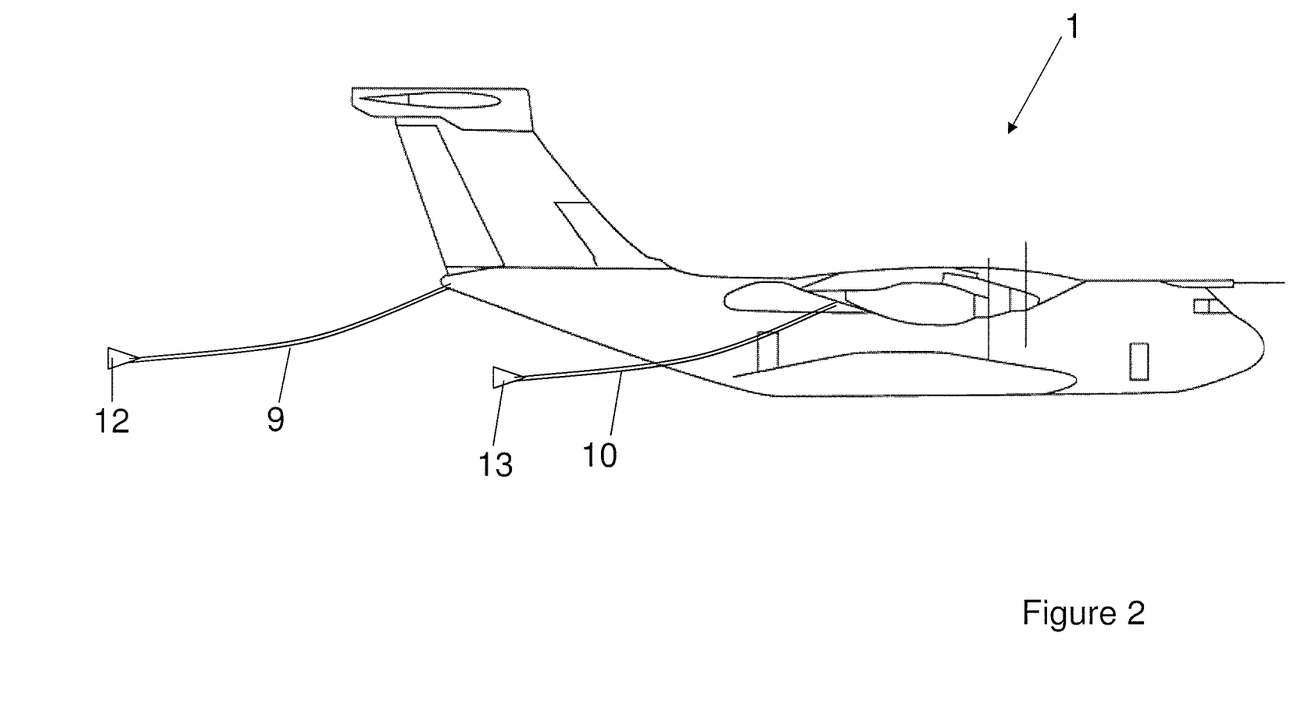
FIG. 2 illustrates a side view of the tanker aircraft.

FIG. 2 illustrates a side view of the aircraft 1 so as to more clearly illustrate the trailing refueling hoses 9, 10. The number and location of the fuel tanks and the number and location of the fuel dispense stations can vary between aircraft and aircraft variants.

Figure 3:
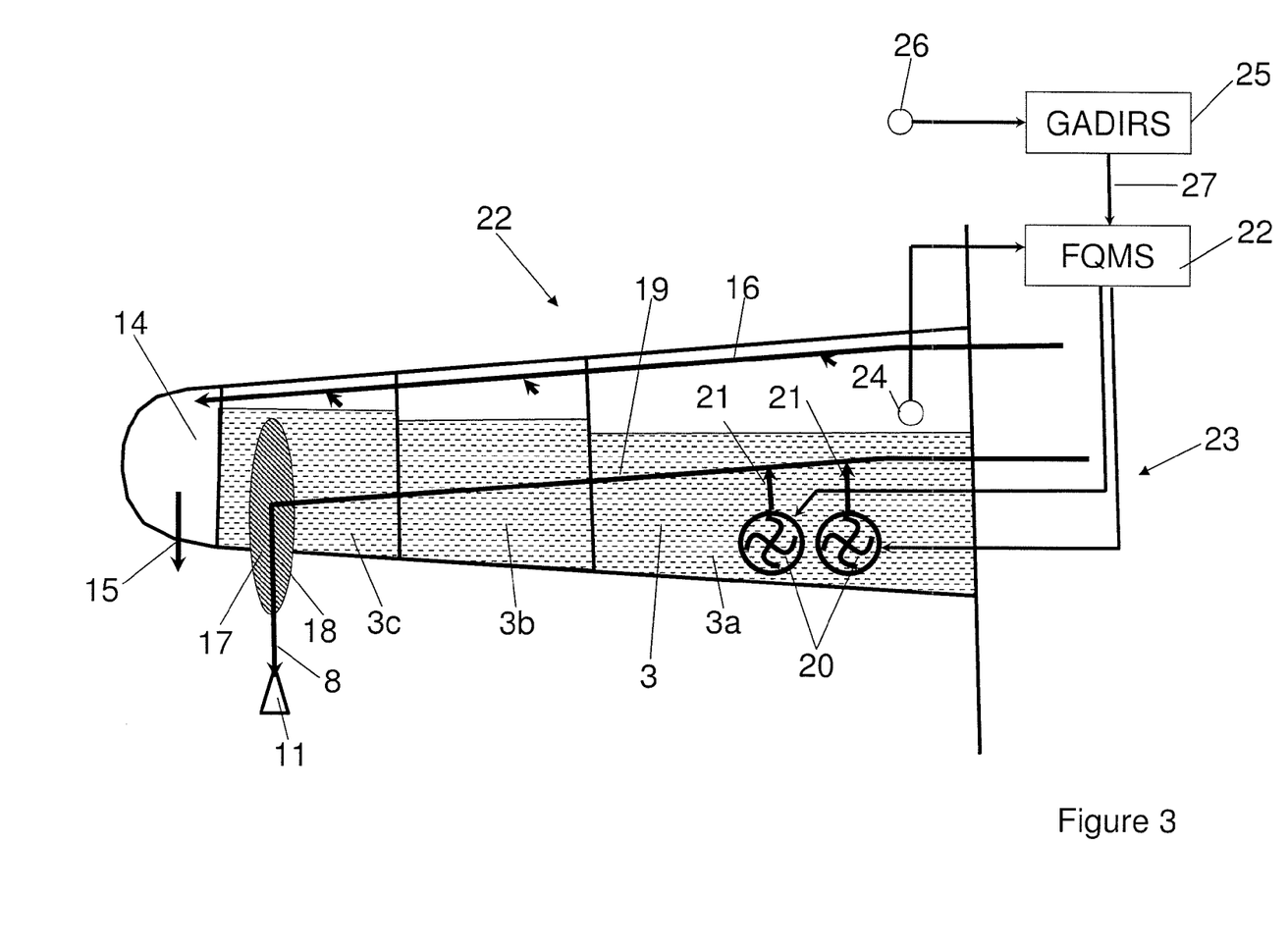
FIG. 3 illustrates a schematic section view through the aircraft wing illustrating the aircraft aerial refueling system including pressure controlled fuel pumps disposed in the lateral wing fuel tank and connected to the left wing refueling dispense pod via a common gallery.

FIG. 3 illustrates a schematic section view through the left wing 2 so as to illustrate some key components of the aircrafts aerial refueling system. The interior volume of the aircraft wing 2 is used as the left wing fuel tank 3 which is split into three compartments 3a, 3b, 3c. The outboard tip of the wing 2 houses a vent tank 14 for ventilating the fuel tank 3 and includes a vent opening 15 on the underside of the wing 2. A vent pipe 16 connects the vent tank 14 to the ullage of the left wing tank 3.

The left wing fuel dispense station 17 comprises a dispense pod 18, and the retractable hose-and-drogue refueling system 8, 11. A fuel pipe 19 fluidically connects the left fuel dispense station 17 to the various fuel tanks 3, 4, 6, 7. The fuel pipe 19 forms part of a common fuel gallery which connects each of the fuel tanks to each of the fuel dispenser stations. Each of the fuel tanks include two high flow rate pressure controlled fuel pumps 20 adapted to pump fuel from their respective fuel tanks in to the common fuel gallery. As can be seen from FIG. 3, the pressure controlled fuel pumps 20 each have an outlet 21 coupled to the fuel pipe 19.

The pressure controlled fuel pumps 20 are individually electrically connected to the aircraft's Fuel Quantity and Management System (FQMS) 22. In the embodiment illustrated in FIG. 3, the FQMS 22 is coupled to the pressure controlled fuel pumps 20 via an isolated bus 23. The FQMS 22 is also coupled to a fuel level sensor within each of the fuel tanks. The fuel level sensor 24 within the left wing fuel tank 3 is visible in FIG. 3. The FQMS 22 uses the fuel level sensors to determine the fuel level within each of the fuel tanks.

The FQMS 22 is coupled to the aircraft's GPS & Air Data & Inertial Reference System (GADIRS) 24. The GADIRS 24 is connected to an ambient air pressure sensor for determining the ambient air pressure outside of the aircraft 1. The FQMS 22 and GADIRS 25 are connected in the usual way to the aircraft cockpit Electronic Centralised Aircraft Monitor (ECAM) (not shown) for relaying information to the aircraft crew. The ECAM can display, for example, the residual fuel volume within each of the fuel tanks 3, 4, 6, 7. The FQMS 22 is coupled to the GADIRS 25 via the aircraft data network 27.

Since the fuel pumps 20 are located within the inner partition 3a of the fuel tank 3, the pressure controlled fuel pumps 20 are regulated such that in the event of a rupture in the fuel pipe 19 within either of the outer partitions 3b or 3c the fuel pumps 20 cannot cause an over-pressure situation within the outer partitions 3b, 3c of the fuel tank 3.

Figure 4:
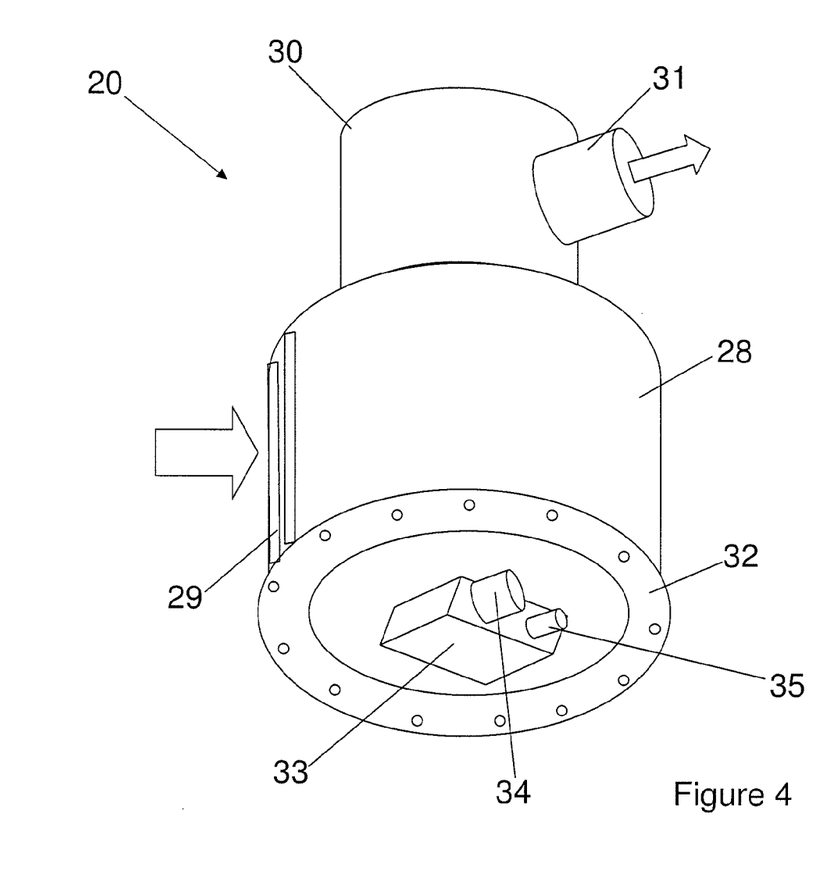
FIG. 4 illustrates schematically the pressure controlled fuel pump having an integrated control system.

FIG. 4 illustrates schematically one of the pressure controlled fuel pumps 20. The fuel pump 20 is of the centrifugal type and includes an impeller housing 28 which houses an impeller, a fuel pick up 29, a motor housing 30 which houses a motor for driving the impeller, and an outlet 31 adapted to expel fuel under pressure into the network of pipes within the aircraft fuel system. The base of the impeller housing 28 includes a flange 32 for securing the fuel pump 20 to the bottom of the respective fuel tanks.

The fuel pump 20 includes an integrated control system 33 mounted on the base of the fuel pump 20. A power in connector 34 connects the pump to the aircraft's electrical power supply and an input connector 35 receives a pressure demand input signal from the FQMS 22 via the optical isolated bus 23.

Figure 5:
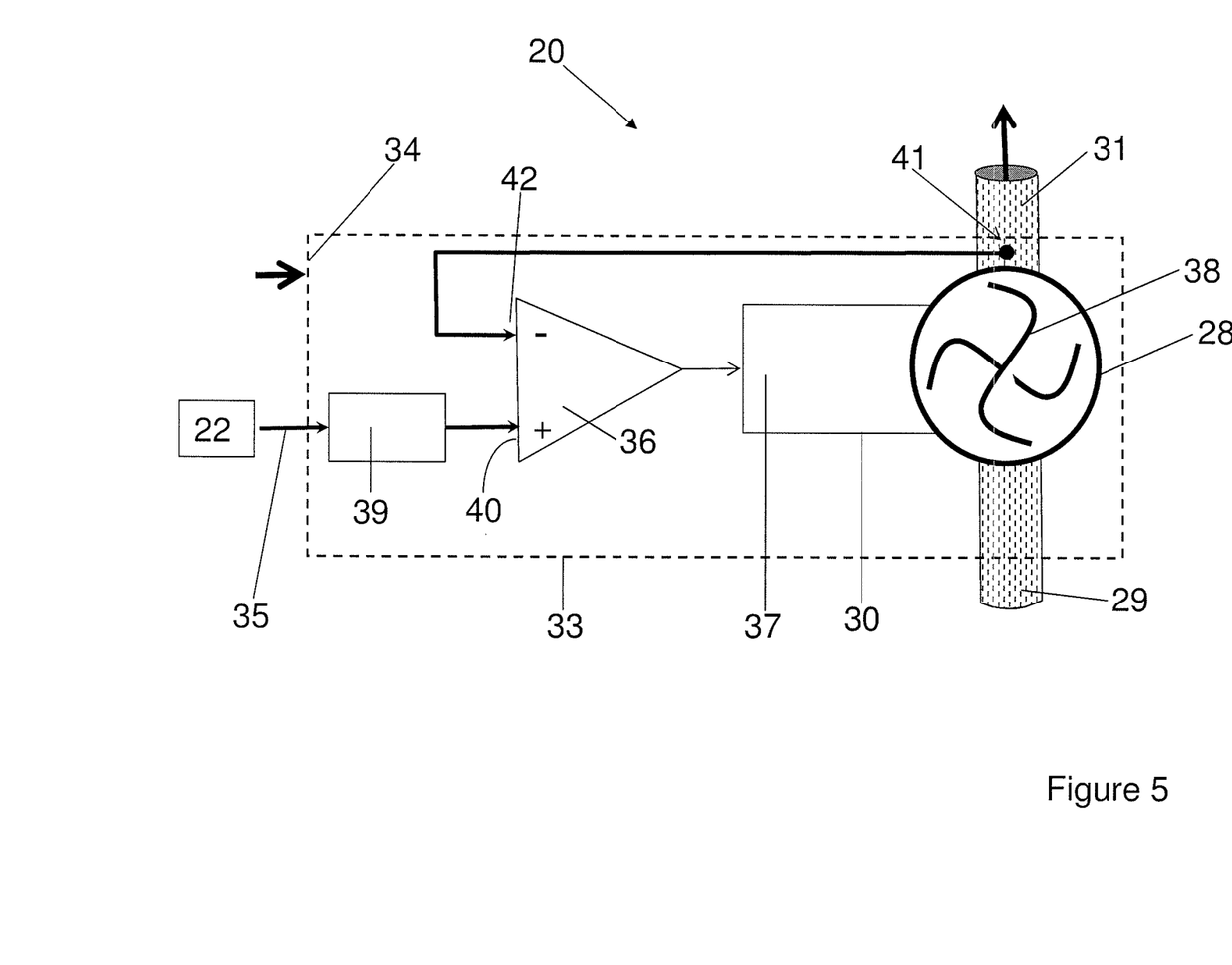
FIG. 5 illustrates schematically the control system of the pressure controlled fuel pump.

FIG. 5 illustrates schematically the control topography of the pressure controlled fuel pump 20. The integrated control system 33 includes a proportional-integral-differential (PID) controller 36 coupled to the pump motor 37 for driving the impeller 38. When a fuel pressure demand signal is received from FQMS 22 via input connector 35, an optical isolated circuit 39 converts a PWM signal into a demand pressure signal at the set point input 40 of the PID controller 36. The controller 36 directs the motor 37 to rotate the impeller 38 so as to pump fuel from the fuel pick up 29 and increase the head of pressure at the fuel outlet 31. An outflow pressure sensor 41 disposed within the outlet 31 is used to detect the fuel pressure in the outlet 31 and an outlet pressure signal is used as the process variable input 42 of the PID controller 36.

The PID controller calculates the error in the process variable input 42 as compared with the demand pressure set point 40 and the PID controller adjusts the power of the motor 37 until the outlet fuel pressure, as detected by pressure sensor 41, equals the demand pressure instructed by FQMS 22. The PID controller 36 is used to minimise the error between the actual outlet pressure at 31 and the demand pressure instructed by FQMS 22 based upon past, present and predicted future errors on a weighted temporal basis. It will be appreciated by those skilled in the art that the PID controller 36 is one example of a control loop feedback mechanism and other control feedback mechanisms may alternatively be used in the pump's control system.

Figure 6:
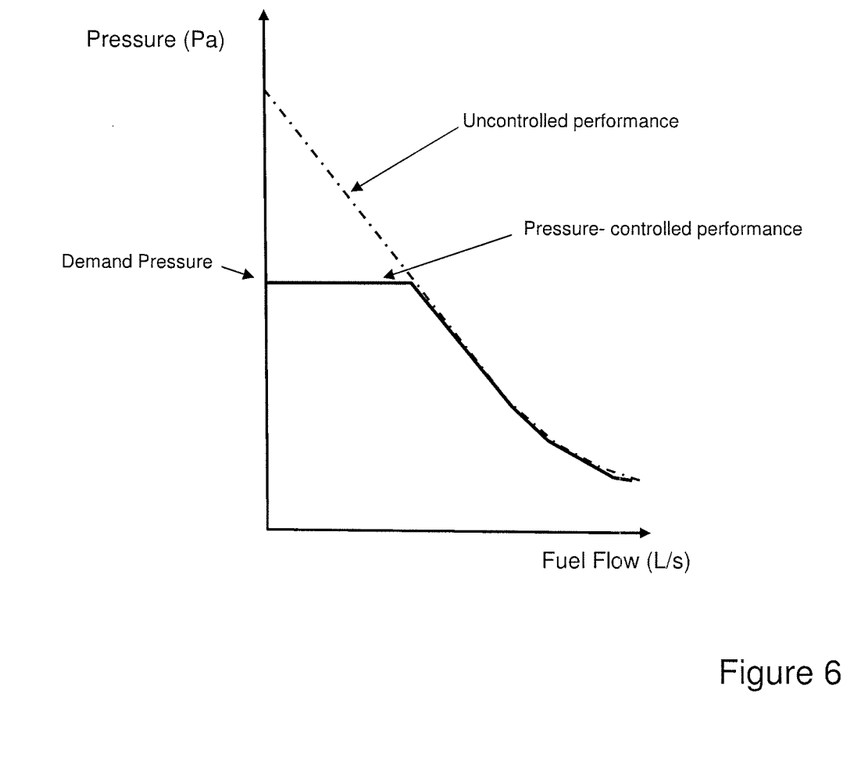
FIG. 6 illustrates graphically the difference in pressure output between a pressure controlled fuel pump and an uncontrolled fuel pump throughout the flow rate output range.

FIG. 6 illustrates graphically the difference between a pressure controlled, or pressure regulated, fuel pump and a typical un-regulated fuel pump. A conventional high power fuel pump with uncontrolled performance has a generally linear relationship between the outlet pressure and output flow rate, and reaches a maximum outlet pressure at zero flow rate. With regulated or pressure controlled performance, the maximum achievable outlet pressure is capped at the demand pressure such that the outlet pressure never reaches the maximum capability of the pump. Accordingly, the fuel tank structure and over flow paths can be designed to a predetermined pipe rupture failure condition rather than a theoretical maximum outlet pressure which the fuel pump would be capable of achieving without the integrated control system.

The pressure controlled performance of the fuel pump 20 brings about several advantages as compared with an unregulated dispense fuel pump. As the aircraft altitude increases, the ambient air pressure drops. Using a conventional fuel pump with uncontrolled performance, the fuel dispense performance will deteriorate at lower altitudes. However, with the pressure controlled pump 20 it becomes possible to vary the regulated performance of the fuel pumps according to the ambient air pressure outside of the aircraft. Accordingly, it becomes possible to maximise the fuel dispense performance regardless of the aircraft altitude, whilst ensuring maximum tank pressures in the event of a pipe rupture are within design limits.

The ambient atmospheric pressure is measured for use by other aircraft systems using the air pressure sensor 26 coupled to GADIRS 25. As shown in FIG. 3, since the FQMS 22 is coupled via the aircraft data network 27 to the GADIRS 25, the FQMS 22 can make use of the ambient atmospheric pressure outside of the aircraft as determined by the air pressure sensor 26. The FQMS 22 is operable to set the maximum demand outlet pressure for each pump 20 at a fixed differential to the measured ambient atmospheric pressure outside the aircraft. As the aircraft ascends to higher altitudes, the maximum demand pressure required of the fuel pumps 20 is correspondingly reduced. As the aircraft descends to lower altitudes, the increasing ambient air pressure outside of the aircraft causes a corresponding increase in the maximum demand pressure which may be required of the fuel pumps 20. This ensures that maximum fuel dispense performance can be achieved even during an aerial refueling operation at low altitude.

Figure 7:
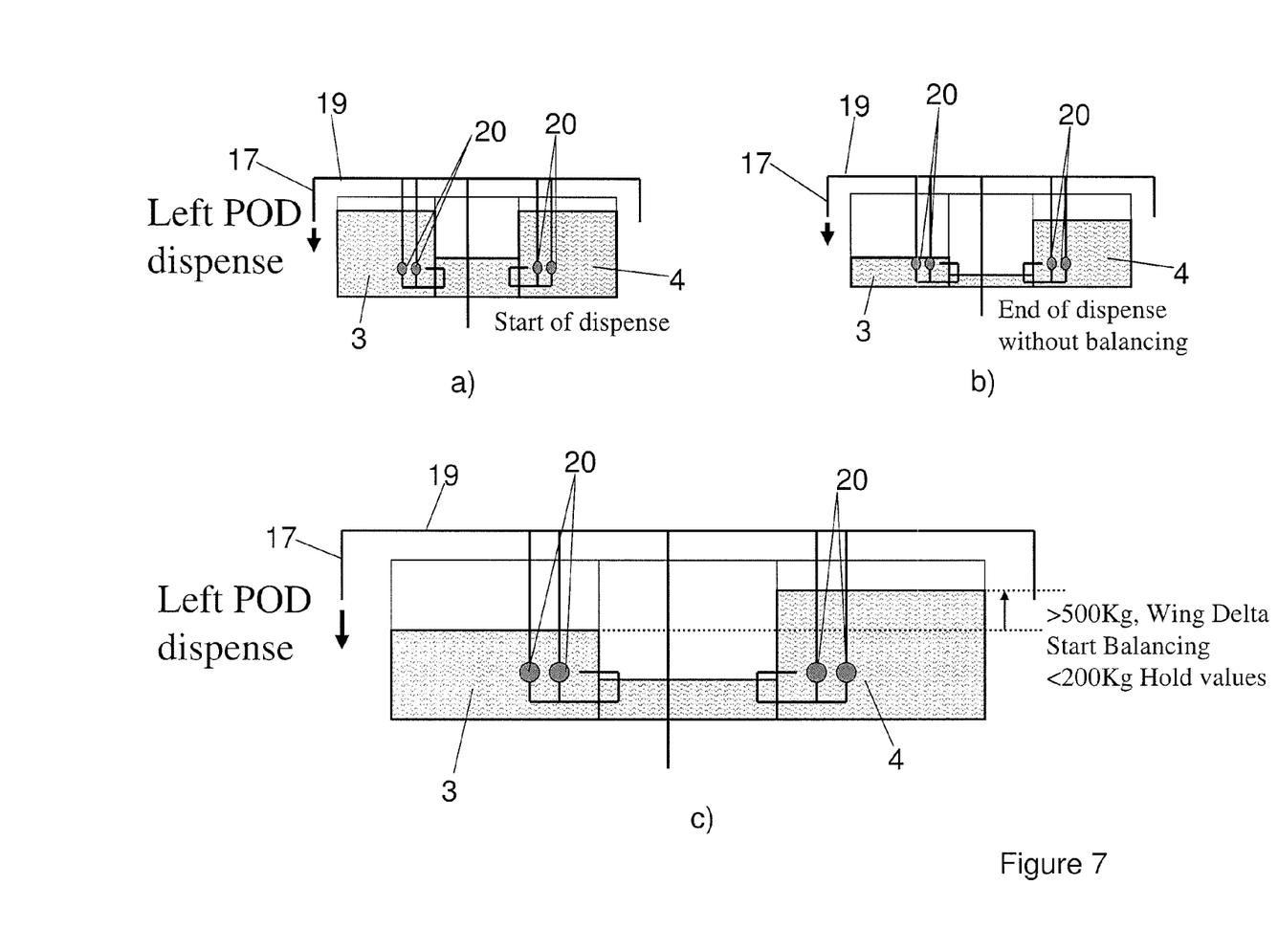
FIG. 7a illustrates schematically the fuel levels in the wing and auxiliary tanks of a balanced aircraft at the start of a refueling operation via the left wing dispense station.
FIG. 7b illustrates schematically the fuel levels in the wing and auxiliary tanks at the end of the dispense operation without fuel dispense balancing.
FIG. 7c illustrates schematically the fuel levels in the wing and auxiliary tanks at the end of the dispense operation with fuel dispense balancing.

Another major benefit of the pressure controlled fuel pump 20 is that it becomes possible to adjust individual pump pressures so as to provide a desired depletion rate for each of the fuel tanks within the aircraft 1. FIG. 7a illustrates schematically the fuel volumes in the left wing tank 3 and the right wing tank 4 at the start of a dispense operation for aerial refueling via the left wing dispense station 17.

FIG. 7b illustrates schematically the fuel levels within the left and right wing fuel tanks 3, 4 (and also the interconnected centre fuel tank) that may be observed at the end of the aerial refueling operation from the left dispense pod 17 if the FQMS 22 were to demand maximum performance from each of the fuel pumps 20 located in the left and right fuel tanks 3, 4. Due to the cross-aircraft flow resistance in fuel pipe 19 (the common fuel gallery) the left wing fuel tank 3 will deplete much faster than the right wing fuel tank 4.

At the high volume flow rates achievable with the fuel pumps 20, the difference in fuel volume between the left and right wing fuel tanks 3, 4 could quickly become substantial during a dispense task, and would require a subsequent fuel balancing operation. This would be necessary to balance the aircraft either for a subsequent refueling operation or a return to base flight sector. Unbalanced wing fuel loads result in intervention from the flight control system which compensates the imbalance with flap settings, resulting in less efficient flight.

FIG. 7c illustrates an embodiment of this invention in which the pressure controlled fuel pumps 20 are directed by FQMS 22 to ensure substantially equal flows from each of the fuel pumps 20 during the left wing dispense operation such that at the end of the dispense operation similar residual fuel volumes remain in the left and right wing fuel tanks 3, 4. No subsequent crew intervention is required to balance the aircraft.

The FQMS 22 determines a nominal maximum demand pressure for each of the pumps 20 depending on the ambient air pressure. When one or more following aircraft connect to respective fuel dispense stations, the FQMS 22 uses an algorithm to set a nominal demand pressure for each of the fuel pumps 20 depending on which of the various dispense stations are active just prior to commencing the aerial refueling dispense operation. The algorithm includes an estimate of the demand pressures required of each pump 20 to achieve equal flow rates from each pump 20 according to the fuel system architecture. Once the dispense operation is under way, the algorithm monitors the instantaneous fuel levels within each of the fuel tanks using the fuel level sensors (see fuel level sensor 24 in FIG. 3) and the FQMS 22 iteratively adjusts the demand pressure for each of the pumps 20 so as to provide approximately matched fuel flows from each pump.

The following worked example is purely exemplary and is used to illustrate how the algorithm handles the scenario depicted in FIG. 7a. Based upon the ambient atmospheric pressure as judged by air pressure sensor 26, the maximum nominal pump pressure for each pump 20 is 25 psig. Prior to commencing the dispense operation, the algorithm detects that the left wing dispense station 17 is the only active dispense station and so lowers the fuel pumps 20 of the left wing fuel tank 3 to a nominal pump pressure of 20 psig, whereas the pumps 20 of the right wing fuel tank 4 are set to the nominal pump pressure 25 psig so as to compensate for cross-aircraft pipe resistance.

Turning now to FIG. 7c, as the dispense operation via the left wing dispense station 17 gets underway, the fuel quantities within the fuel tanks 3 and 4 are monitored at regular intervals (e.g. every 10 seconds to allow time for the system to stabilise) and any difference between the fuel weight in the left wing tank 3 and the right wing tank 4 is calculated.

If the left tank 3 holds at least 500 kg more fuel than the right tank 4 then the algorithm increases the left pump pressures by 1 psi. If the right tank 4 holds at least 500 kg more fuel than the left tank 3 then the algorithm decreases the left pump pressures by 1 psi. If the left tank 3 holds at least 200 kg more fuel than the right tank 4 then the algorithm increases the left pump pressures by 0.1 psi. If the right tank 4 holds at least 200 kg more fuel than the left tank 3 then the algorithm decreases the left pump pressures by 0.1 psi. If the fuel weight difference between the left and right wing fuel tanks 3, 4 is less than 200 kgs then the algorithm holds the demand pressures of the left and right pumps. At the end of the dispense operation, the algorithm holds the demand pressures of the left and right pumps until they are switched off.

If both the left and right pumps are operating at the maximum nominal pump pressure of 25 psig and an unbalanced fuel weight situation develops then the algorithm adjusts the right pump pressure lower. This is likely only to occur where the dispense is from the tail dispense station, where it is unclear which of the left and right pumps will dominate.

The iterative incremental adjustments to the demand pressures set out above are purely exemplary and the interval may be configured as desired. Similarly, the fuel weight difference wing deltas set out above are purely exemplary and other wing deltas may alternatively be used as desired.

Whilst in the above example, the algorithm is used for lateral fuel weight/aircraft balancing it will be appreciated that since the aircraft 1 includes two cargo hold auxiliary tanks 6, 7, one disposed aft of the wing fuel tanks 3, 4 and another disposed forward of the wing fuel tanks 3, 4, a similar algorithm may also be used for longitudinal balancing of the aircraft fuel weight/aircraft centre of gravity.

Although the invention has been described above with reference to one or more preferred embodiments, it will be appreciated that various changes or modifications may be made without departing from the scope of the invention as defined in the appended claims.

The invention claimed is:

1. An aircraft aerial refuelling system, comprising:
   a plurality of aircraft fuel tanks,
   at least one aerial refuelling dispense station,
   a plurality of pressure controlled fuel pumps each having an outlet and a fuel pick-up,
   each of said plurality of fuel tanks in fluid communication with at least one of said fuel pick-ups of said plurality of pressure controlled fuel pumps, and each outlet including a pressure sensor configured to transmit an outlet fuel pressure signal,
   a fuel pipe fluidically connecting the outlet of each of the plurality of pressure controlled fuel pumps to the at least one aerial refuelling dispense station, and
   a pump control system configured to:
   receive a demand fuel pressure signal, and
   compare the demand fuel pressure signal with the outlet fuel pressure signal.

2. The aircraft aerial refuelling system according to claim 1, wherein the pump control system is further configured to provide a pump drive signal to the pump based upon the demand fuel pressure input signal and any difference between a value of the demand fuel pressure signal and a value of the outlet fuel pressure signal.

3. The aircraft aerial refuelling system according to claim 2, wherein the pump control system includes a proportional-integral-differential (PID) controller for comparing the demand fuel pressure input signal with the outlet fuel pressure signal.

4. The aircraft aerial refuelling system according to claim 1, further comprising a Fuel Quantity and Management System (FQMS) adapted to provide the demand fuel pressure signal to the pump control system.

5. The aircraft aerial refuelling system according to claim 1, wherein the demand fuel pressure signal is dependent upon an ambient air pressure outside an aircraft.

6. The aircraft aerial refuelling system according to claim 4, wherein the FQMS is adapted to receive an ambient air pressure signal and to modify the demand fuel pressure signal according to a value of an ambient air pressure outside an aircraft.

7. The aircraft aerial refuelling system according to claim 6, further comprising a Air Data System (ADS), wherein the ADS is adapted to provide the ambient air pressure signal to the FQMS.

8. The aircraft aerial refuelling system according to claim 1, wherein the pump includes a motor adapted to receive a pump drive signal from the control system.

9. The aircraft aerial refuelling system according to claim 1, wherein the pump is a centrifugal pump including an impeller.

10. The aircraft aerial refuelling system according to claim 1, further comprising computer readable storage media containing a set of instructions for controlling the pressure controlled fuel pumps individually.

11. The aircraft aerial refuelling system according to claim 10, wherein the set of instructions includes a set of nominal pump outlet pressure settings for the plurality of pressure controlled fuel pumps depending on the status of the aerial refuelling dispense station(s).

12. The aircraft aerial refuelling system according to claim 11, wherein the set of instructions further includes a set of pump outlet pressure setting adjustments for the plurality of pressure controlled fuel pumps depending on a fuel volume within each tank.

13. The aircraft aerial refuelling system according to claim 12, further comprising a Fuel Quantity and Management System (FQMS) configured to measure the fuel level within each tank.

14. The aircraft aerial refuelling system according to claim 12, wherein the set of pump outlet pressure setting adjustments are configured to automatically adjust the aircraft weight balance to within predetermined limits.

15. A method of operating an aircraft aerial refuelling system, comprising:
   providing a plurality of aircraft fuel tanks,
      at least one aerial refuelling fuel dispense station,
      a plurality of pressure controlled fuel pumps each having an outlet and a fuel pick-up,
      each of said plurality of fuel tanks in fluid communication with at least one of said fuel pick-ups of said plurality of pressure controlled fuel pumps, and each outlet including a pressure sensor configured to transmit an outlet fuel pressure signal, and
      a fuel pipe fluidically connecting the outlet of each of the plurality of pressure controlled fuel pumps to the at least one aerial refuelling dispense station,
   the method comprising controlling the pump outlet fuel pressure using the outlet fuel pressure signal as control feedback.

16. The method of operating an aircraft aerial refuelling system according to claim 15, wherein the regulating step includes comparing a demand fuel pressure signal with the outlet fuel pressure signal, and automatically controlling the pump to ensure that the outlet fuel pressure does not exceed the demand fuel pressure.

17. The method according to claim 15, further comprising automatically regulating the maximum pump outlet fuel pressure depending on the ambient air pressure outside the aircraft.

18. A method of operating an aircraft aerial refuelling system, comprising:
   providing a plurality of aircraft fuel tanks,
      a plurality of aerial refuelling dispense stations,
      a plurality of pressure controlled fuel pumps each having an outlet and a fuel pick-up,
      each of said plurality of fuel tanks in fluid communication with at least one of said fuel pick-ups of said plurality of pressure controlled fuel pumps, and each outlet including a pressure sensor configured to transmit an outlet fuel pressure signal, and
      a fuel pipe fluidically connecting the outlet of each of the plurality of pressure controlled fuel pumps to the at least one aerial refuelling dispense station, the method comprising automatically substantially maintaining fuel balance between the tanks during a high flow rate fuel dispense from the plurality of fuel tanks simultaneously via one or more of the aerial refuelling dispense stations by controlling a pressure of the outlet of each of said plurality of pressure controlled fuel pumps.

19. A method of operating an aircraft aerial refuelling system, comprising:
providing a plurality of fuel tanks,
a plurality of aerial refuelling dispense stations,
a plurality of pressure controlled fuel pumps each having an outlet and a fuel pick-up,
each of said plurality of fuel tanks in fluid communication with at least one of said fuel pick-ups of said plurality of pressure controlled fuel pumps, and each outlet including a pressure sensor configured to transmit an outlet fuel pressure signal, and
a fuel pipe fluidically connecting the outlet of each of the plurality of pressure controlled fuel pumps to the at least one aerial refuelling dispense station,
the method comprising automatically substantially maintaining aircraft lateral and/or longitudinal weight balance during a high flow rate fuel dispense from the plurality of fuel tanks simultaneously via one or more of the aerial refuelling dispense stations by controlling a pressure of the outlet of each of said pressure controlled fuel pumps.

20. The method according to claim 18, wherein controlling the outlet pressure of each fuel pump includes setting a nominal outlet pressure for each fuel pump depending on the fuel system architecture and/or performance, and the status of the one or more aerial refuelling dispense stations.

21. The method according to claim 20, wherein controlling the outlet pressure of each fuel pump further includes monitoring a fuel level within each fuel tank and adjusting the outlet pressure for each fuel pump depending on the measured fuel levels.

* * * * *